(12) United States Patent
Wang et al.

(10) Patent No.: US 8,811,142 B2
(45) Date of Patent: Aug. 19, 2014

(54) METHOD AND APPARATUS TO FACILITATE USE OF LTE CHANNELIZATION STRUCTURES AND WAVEFORMS FOR PEER-TO-PEER COMMUNICATIONS

(75) Inventors: Renqiu Wang, San Diego, CA (US);
Ravi Palanki, San Diego, CA (US);
Naga Bhushan, San Diego, CA (US);
Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/231,748

(22) Filed: Sep. 13, 2011

(65) Prior Publication Data

US 2012/0120885 A1    May 17, 2012

Related U.S. Application Data

(60) Provisional application No. 61/382,212, filed on Sep. 13, 2010.

(51) Int. Cl.
*H04L 5/04* (2006.01)
*H04J 9/00* (2006.01)
*H04W 72/04* (2009.01)
*H04W 76/02* (2009.01)

(52) U.S. Cl.
CPC ............ *H04W 72/04* (2013.01); *H04W 76/023* (2013.01)
USPC ........... 370/204; 370/330; 370/348; 370/438; 370/462

(58) Field of Classification Search
USPC ......... 370/204, 328, 329, 330, 334, 341, 348, 370/432, 438, 437, 461–462
See application file for complete search history.

(56) References Cited

U.S. PATENT DOCUMENTS

| 8,526,347 B2 | 9/2013 | Wang et al. |
| 2003/0086384 A1* | 5/2003 | Kwon et al. ................. 370/320 |
| 2005/0239451 A1 | 10/2005 | Periyalwar et al. |

(Continued)

FOREIGN PATENT DOCUMENTS

| WO | 2008005922 | 1/2008 |
| WO | 2010059856 A1 | 5/2010 |

(Continued)

OTHER PUBLICATIONS

Chen, et al., Time Hopping for Device-to-device Communication in LTE Cellular System, Wireless Communcations and Networking Conference (WCNC), 2010 IEEE, pp. 1-6.

(Continued)

*Primary Examiner* — Benjamin H Elliott, IV
(74) *Attorney, Agent, or Firm* — James K. O'Hare

(57) ABSTRACT

A method, an apparatus, and a computer program product for wireless communication are provided in which a UE is equipped to receive first peer-to-peer communications using a first network communication channelization and a waveform, and transmit second peer-to-peer communications using a second network communication channelization and the waveform. Further, the UE may be equipped to map one or more channels in the second peer-to-peer communications to one or more uplink channels and/or downlink channels in the second network communication channelization. The second network communication channelization may include an LTE uplink/downlink channelization. The waveform may include OFDM or SC-FDM.

68 Claims, 16 Drawing Sheets

(56) References Cited

U.S. PATENT DOCUMENTS

| | | |
|---|---|---|
| 2009/0010185 A1 | 1/2009 | Li et al. |
| 2009/0017838 A1 | 1/2009 | Laroia et al. |
| 2010/0191759 A1 | 7/2010 | Li et al. |
| 2011/0103317 A1* | 5/2011 | Ribeiro et al. ............ 370/329 |
| 2012/0120885 A1* | 5/2012 | Wang et al. ............ 370/329 |

FOREIGN PATENT DOCUMENTS

| | | |
|---|---|---|
| WO | 2010078271 A2 | 7/2010 |
| WO | WO-2010088431 | 8/2010 |
| WO | WO-2011156638 | 12/2011 |

OTHER PUBLICATIONS

Doppler, et al., Device-to-Device Communication as an Underlay to LTE-Advanced Networks, Communications Magazine, IEEE Dec. 2009, vol. 47, Issue 12, pp. 42-49.

Yu, et al., Resource Sharing Optimization for Device-to-Device Communication Underlaying Cellular Networks, IEEE Transactions on Wirelss Communications, 2011, pp. 1-12.

International Search Report and Written Opinion—PCT/US2011/051455—ISA/EPO—Nov. 21, 2011.

Samsung: "CQI report formats", 3GPP Draft; R1-080695, 3rd Generation Partnership Project (3GPP), Mobile Competence Centre ; 650, Route Des Luci0les ; F-06921 Sophia-Antipolis Cedex ; France, vol. RAN WG1, No. Sorrento, Italy; Feb. 6, 2008, XP050109190, [retrieved on Feb. 6, 2008].

Tao Peng et al., "Interference avoidance mechanisms in the hybrid cellular and device-to-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7 abstract, chapters I, II, III.

\* cited by examiner

METHOD AND APPARATUS TO FACILITATE USE OF LTE CHANNELIZATION STRUCTURES AND WAVEFORMS FOR PEER-TO-PEER COMMUNICATIONS

CROSS-REFERENCE TO RELATED APPLICATION(S)

This application claims the benefit of U.S. Provisional Application Ser. No. 61/382,212, entitled "Alternative P2P PHY layer design for direct communications in LTE system" and filed on Sep. 13, 2010, which is expressly incorporated by reference herein in its entirety.

BACKGROUND

1. Field

The present disclosure relates generally to communication systems, and more particularly, to a user equipment (UE) that is operable to use LTE channelization structures and waveforms for peer-to-peer communications.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling a UE to use LTE channelization for P2P communications. In one example, a UE may be equipped receive first peer-to-peer communications using a first network communication channelization and a waveform, and transmit second peer-to-peer communications using a second network communication channelization and the waveform. Further, the UE may be equipped to map one or more channels in the second peer-to-peer communications to one or more uplink channels and/or downlink channels in the second network communication channelization. The second network communication channelization may include an LTE uplink/downlink channelization. The waveform may include OFDM or SC-FDM.

According to related aspects, a method for enabling a UE use LTE channelization for P2P communications is provided. The method can comprise receiving first peer-to-peer communications using a first network communication channelization and a waveform. Moreover, the method may include transmitting second peer-to-peer communications using a second network communication channelization and the waveform.

Another aspect relates to a wireless communications apparatus enabled to use LTE channelization for P2P communications. The wireless communications apparatus can comprise means for receiving first peer-to-peer communications using a first network communication channelization and a waveform. Moreover, the wireless communications apparatus can include means for transmitting second peer-to-peer communications using a second network communication channelization and the waveform.

Another aspect relates to a wireless communications apparatus. The apparatus can include a processing system configured to receive first peer-to-peer communications using a first network communication channelization and a waveform. Moreover, the processing system may further be configured to transmit second peer-to-peer communications using a second network communication channelization and the waveform.

Still another aspect relates to a computer program product, which can have a computer-readable medium comprising code for receiving first peer-to-peer communications using a first network communication channelization and a waveform. Moreover, the computer-readable medium can comprise code for transmitting second peer-to-peer communications using a second network communication channelization and the waveform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
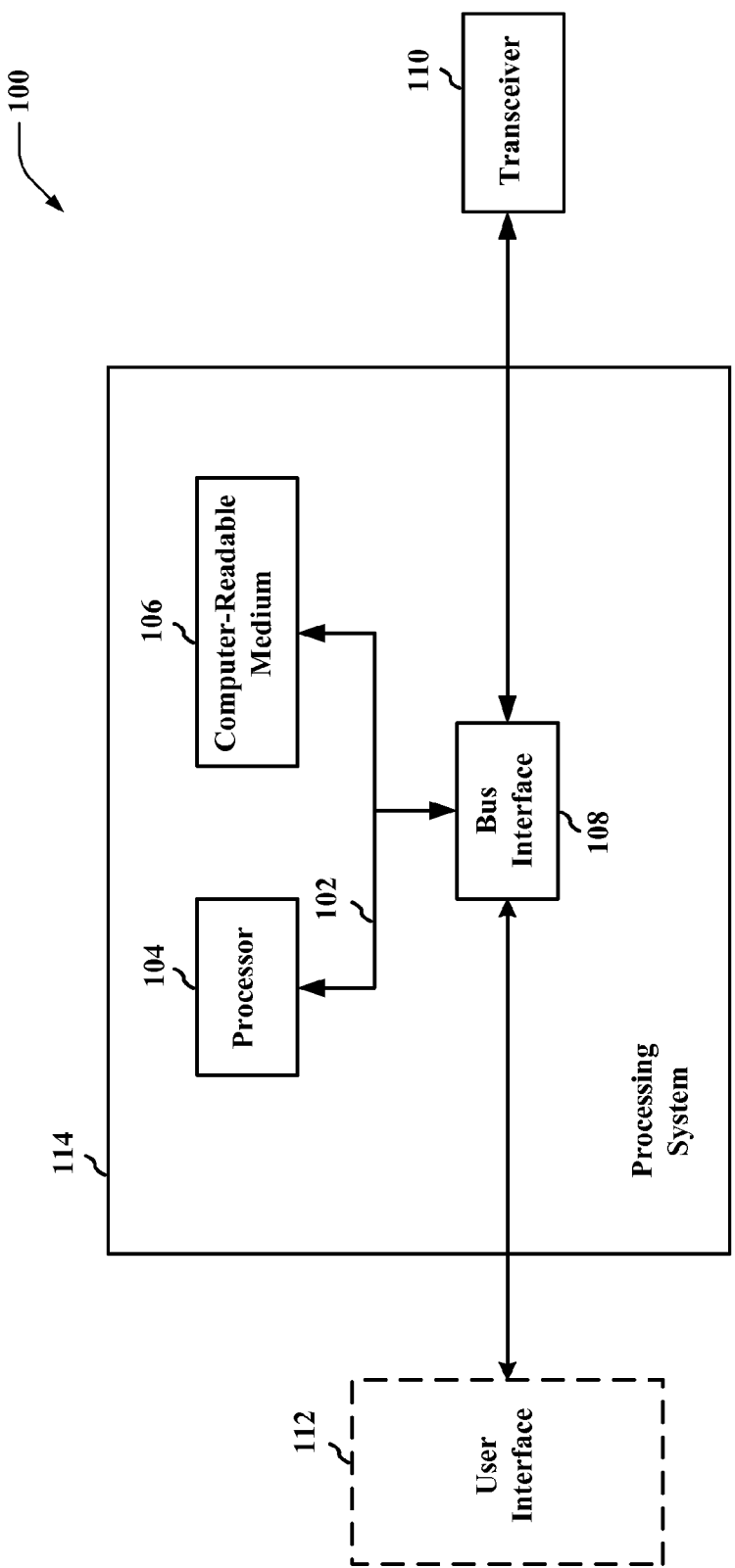
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
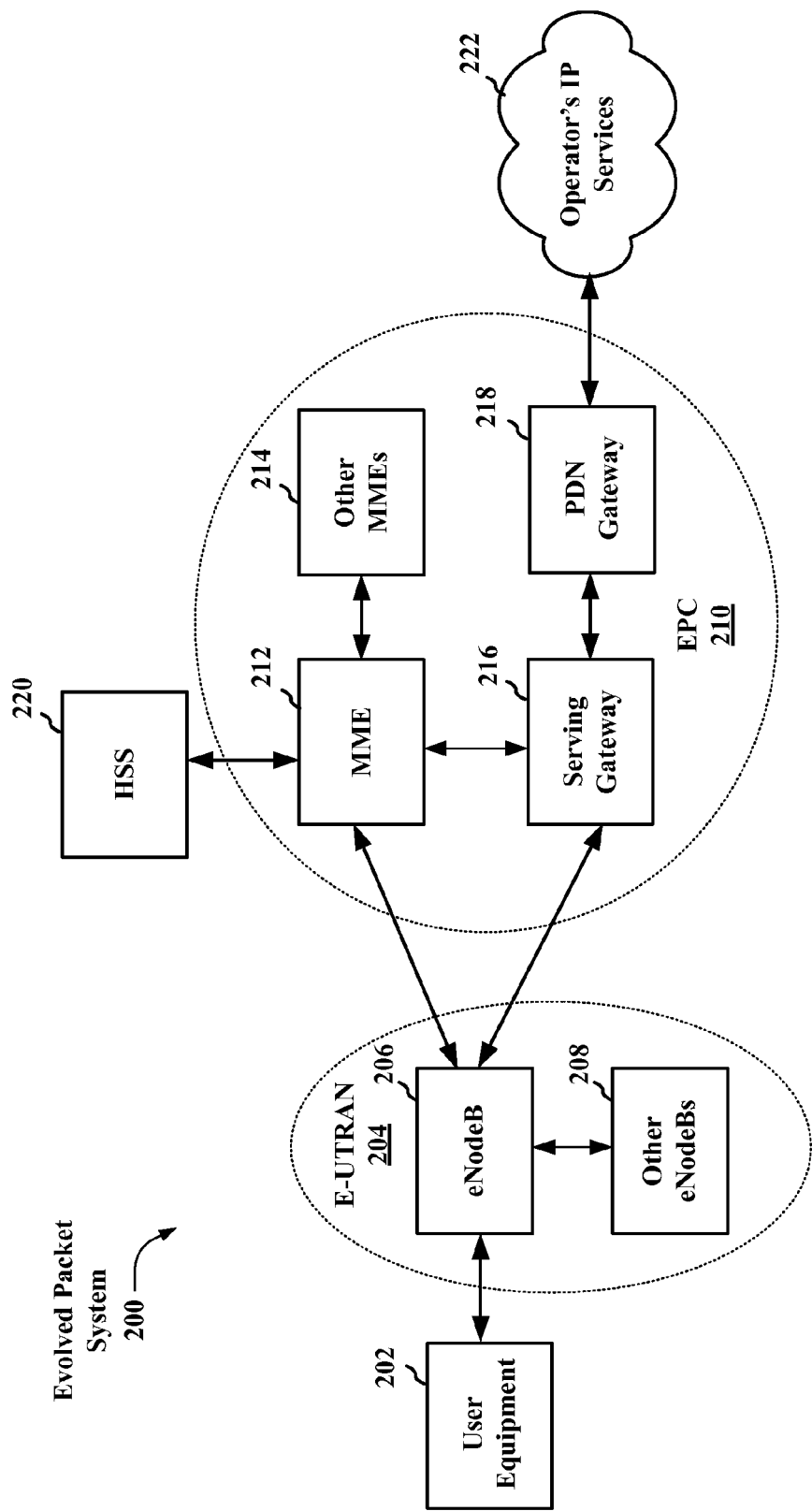
FIG. 2 is a diagram illustrating an example of a network architecture.

FIG. 2 is a diagram illustrating an LTE network architecture 200 employing various apparatuses 100 (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an 51 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service.

Figure 3:
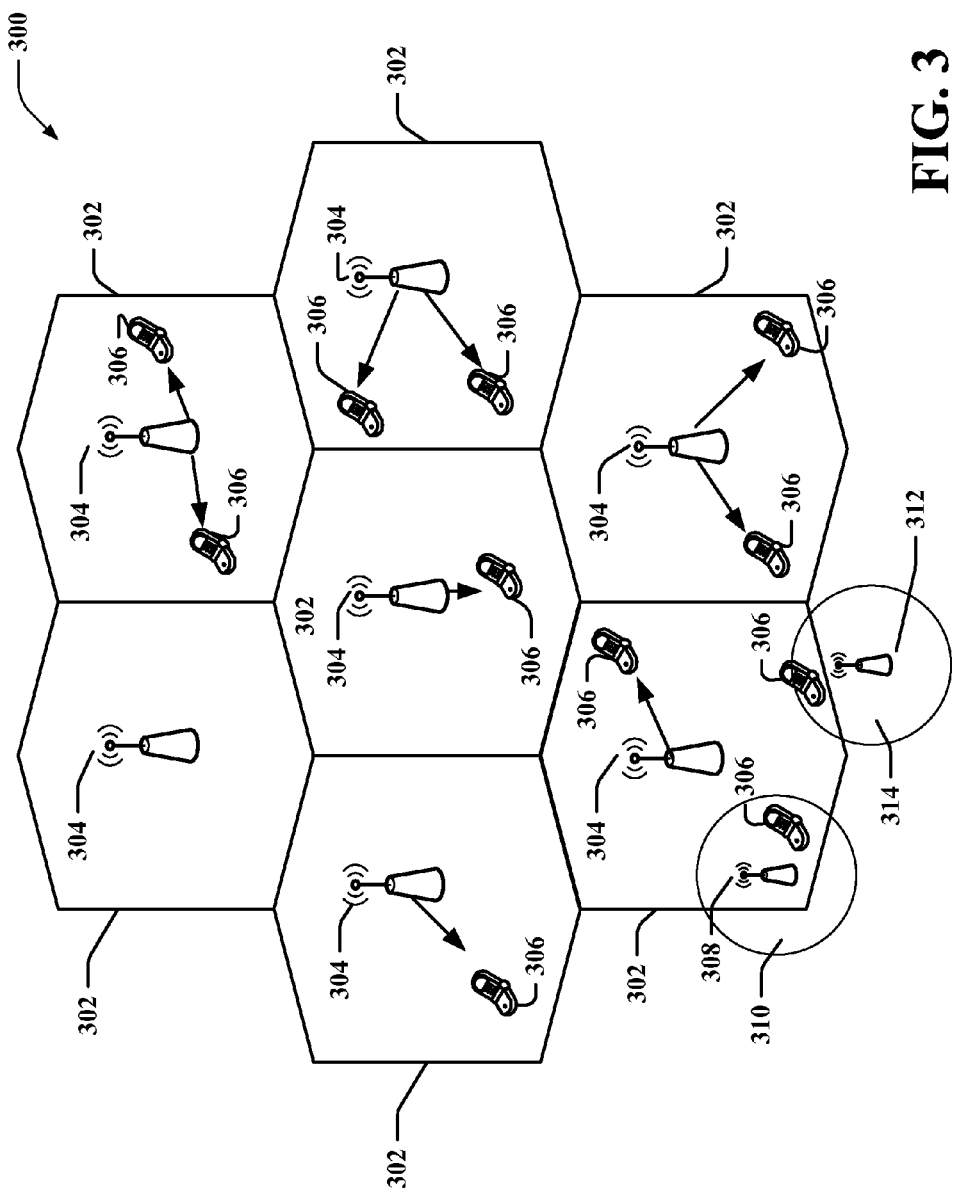
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a discrete Fourier transform (DFT)-spread OFDM signal to compensate for high peak-to-average power ratio (PAPR).

Figure 4:
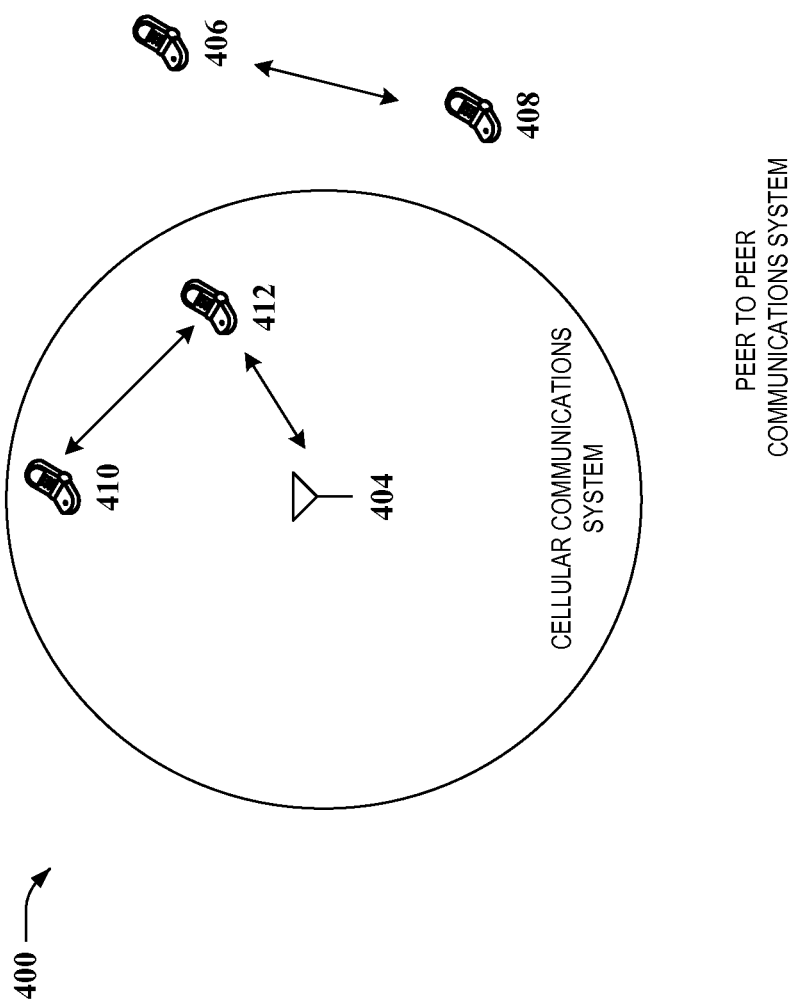
FIG. 4 is a diagram illustrating an example of a wireless peer-to-peer communications system.

FIG. 4 is a drawing of an exemplary peer-to-peer communications system 400. The peer-to-peer communications system 400 includes a plurality of wireless devices 406, 408, 410, 412. The peer-to-peer communications system 400 may overlap with a cellular communications system, such as for example, a wireless wide area network (WWAN). Some of the wireless devices 406, 408, 410, 412 may communicate together in peer-to-peer communication, some may communicate with the base station 404, and some may do both. For example, as shown in FIG. 4, the wireless devices 406, 408 are in peer-to-peer communication and the wireless devices 410, 412 are in peer-to-peer communication. The wireless device 412 is also communicating with the base station 404.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 5:
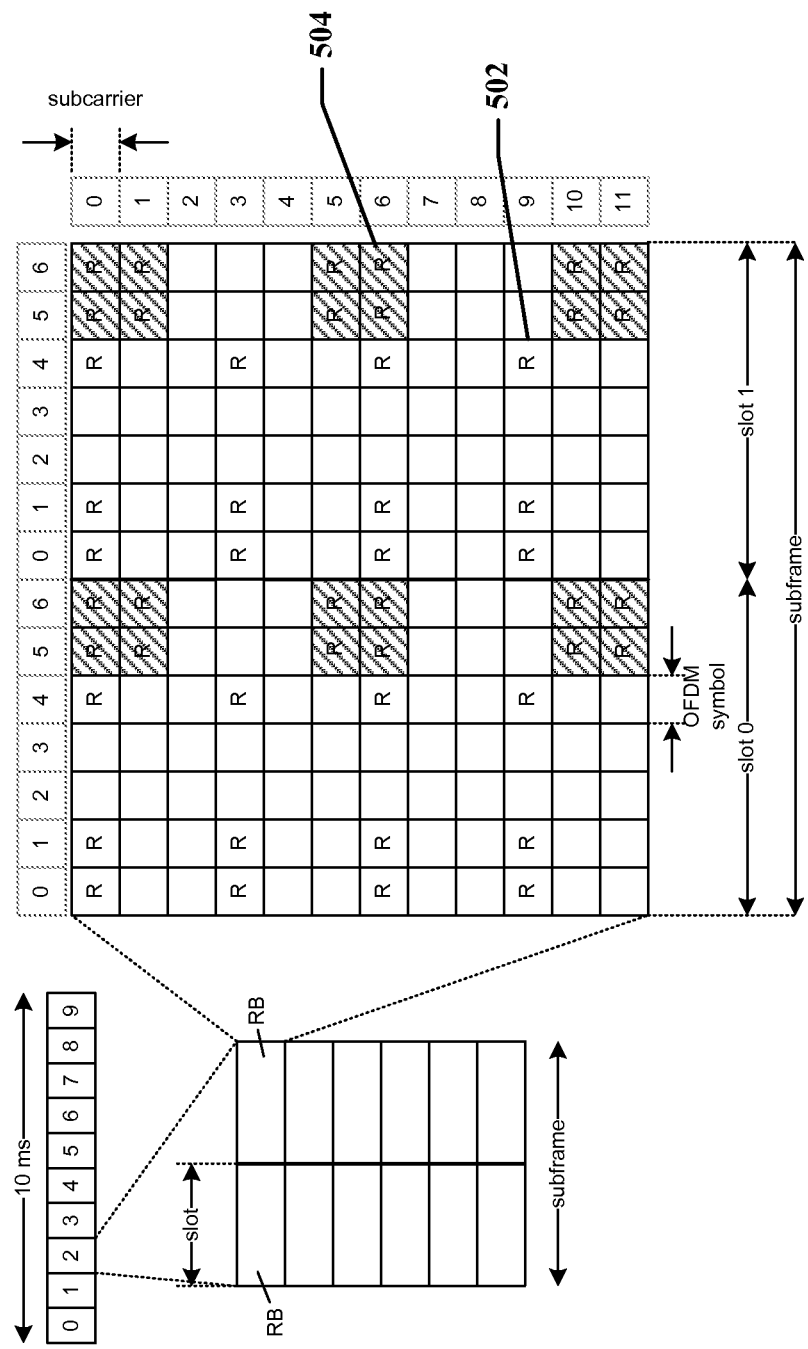
FIG. 5 is a diagram illustrating an example of a frame structure for use in an access network.

Various frame structures may be used to support the DL and UL transmissions. An example of a DL frame structure will now be presented with reference to FIG. 5. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 502, 504, include DL reference signals (DL-RS). The DL-RS include Cell-specific RS (CRS) (also sometimes called common RS) 502 and UE-specific RS (UE-RS) 504. UE-RS 504 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 6:
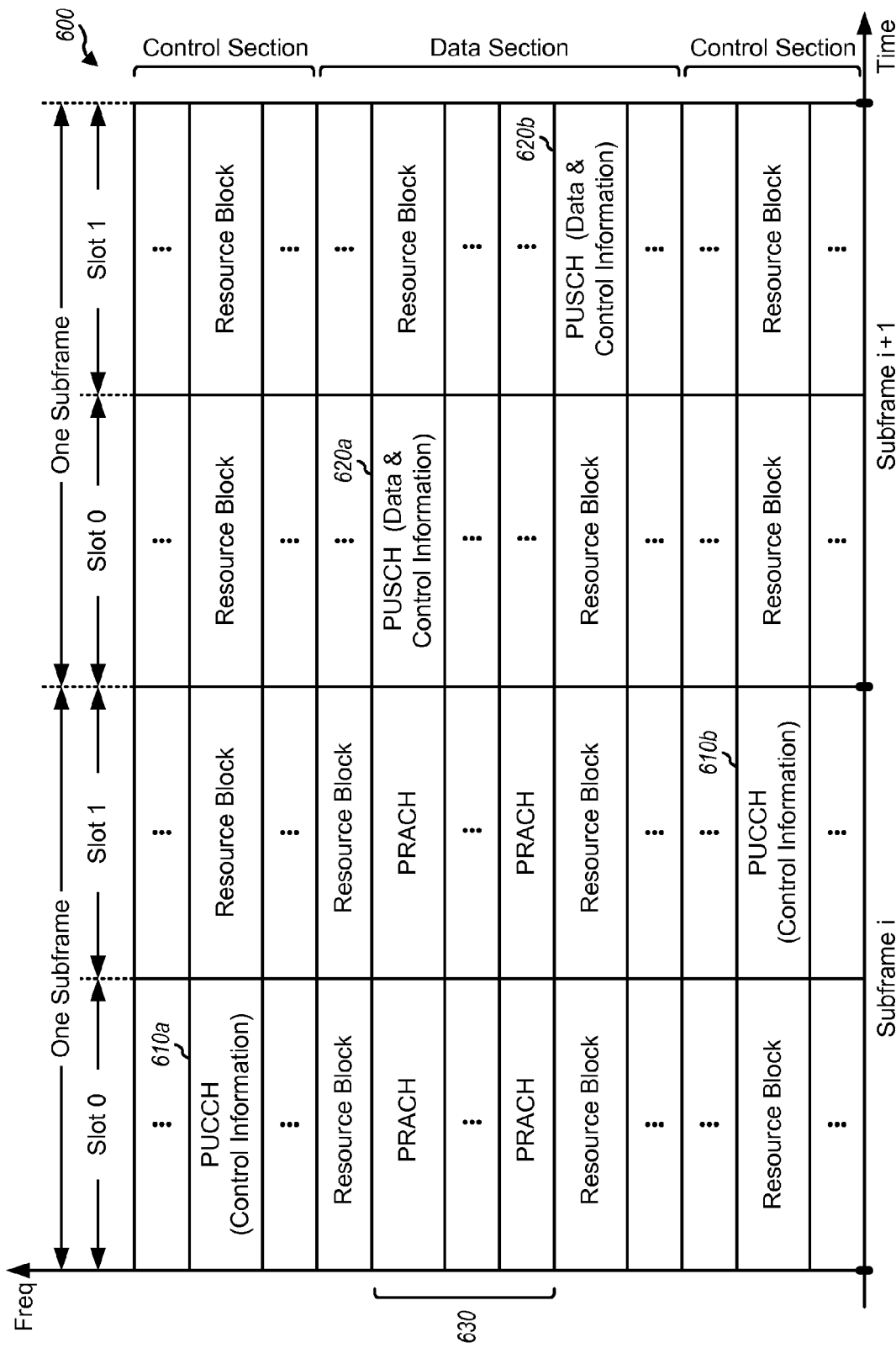
FIG. 6 shows an exemplary format for the UL in LTE.

An example of a UL frame structure 600 will now be presented with reference to FIG. 6. FIG. 6 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 6 results in the data section including contiguous subcarriers, which may allow a single UE to be assigned all of the contiguous subcarriers in the data section.

A UE may be assigned resource blocks 610a, 610b in the control section to transmit control information to an eNB. The UE may also be assigned resource blocks 620a, 620b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 6.

As shown in FIG. 6, a set of resource blocks may be used to perform initial system access and achieve UL synchronization in a physical random access channel (PRACH) 630. The PRACH 630 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 7:
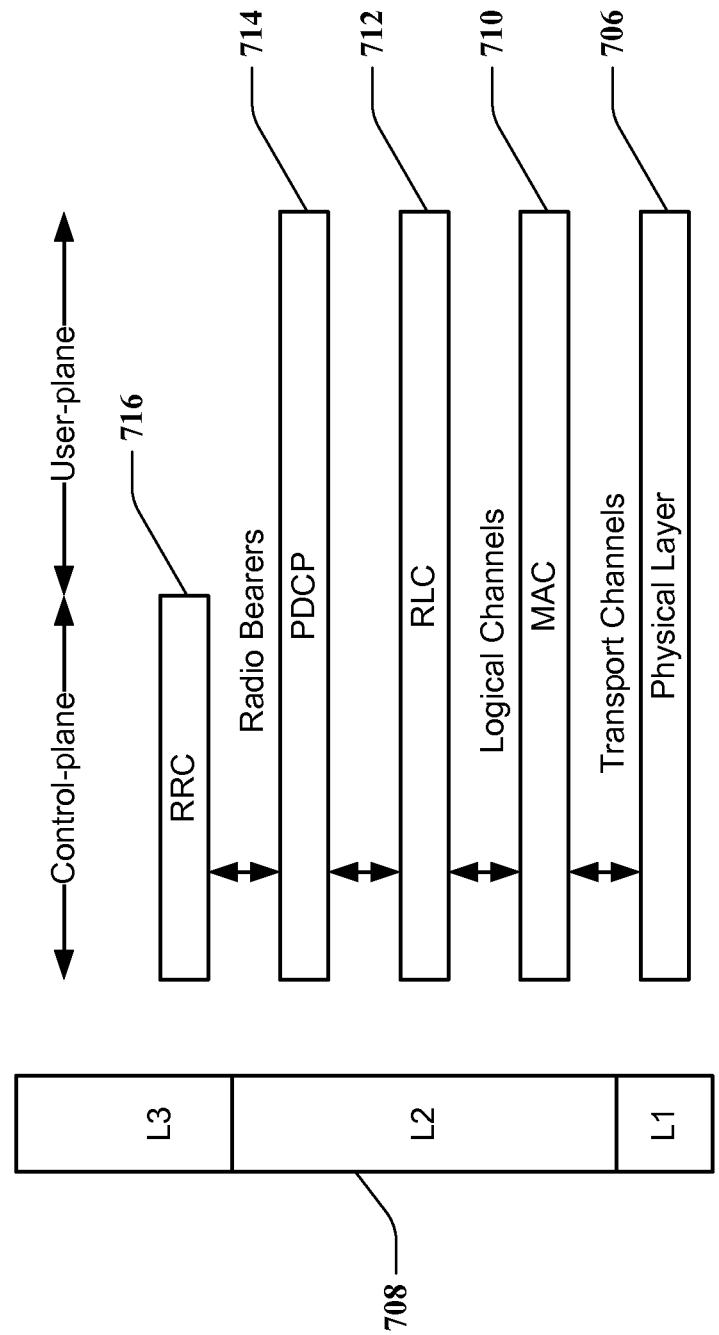
FIG. 7 is a diagram illustrating an example of a radio protocol architecture for the user and control plane.

The radio protocol architecture may take on various forms depending on the particular application. An example for an LTE system will now be presented with reference to FIG. 7. FIG. 7 is a conceptual diagram illustrating an example of the radio protocol architecture for the user and control planes.

Turning to FIG. 7, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 706. Layer 2 (L2 layer) 708 is above the physical layer 706 and is responsible for the link between the UE and eNB over the physical layer 706.

In the user plane, the L2 layer 708 includes a media access control (MAC) sublayer 710, a radio link control (RLC) sublayer 712, and a packet data convergence protocol (PDCP) 714 sublayer, which are terminated at the eNB on the network side. Although not shown, the UE may have several upper layers above the L2 layer 708 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between eNBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

In the control plane, the radio protocol architecture for the UE and eNB is substantially the same for the physical layer 706 and the L2 layer 708 with the exception that there is no header compression function for the control plane. The control plane also includes a radio resource control (RRC) sublayer 716 in Layer 3. The RRC sublayer 716 is responsible for obtaining radio resources (i.e., radio bearers) and for configuring the lower layers using RRC signaling between the eNB and the UE.

Figure 8:
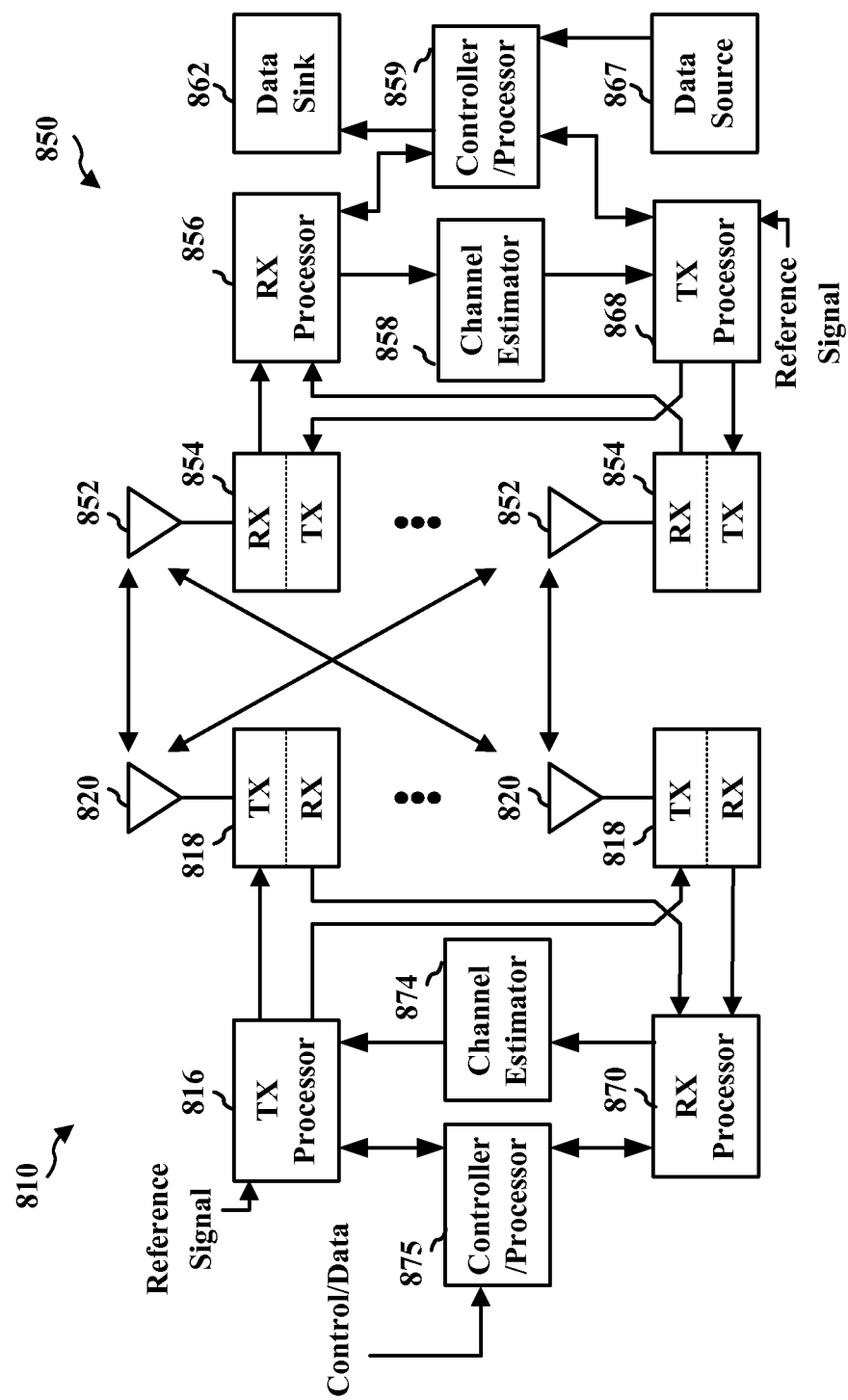
FIG. 8 is a diagram illustrating an example of an evolved Node B and user equipment in an access network.

FIG. 8 is a block diagram of an eNB 810 in communication with a UE 850 in an access network. In the DL, upper layer packets from the core network are provided to a controller/processor 875. The controller/processor 875 implements the functionality of the L2 layer described earlier in connection with FIG. 7. In the DL, the controller/processor 875 provides header compression, ciphering, packet segmentation and reordering, multiplexing between logical and transport channels, and radio resource allocations to the UE 850 based on various priority metrics. The controller/processor 875 is also responsible for HARQ operations, retransmission of lost packets, and signaling to the UE 850.

The TX processor 816 implements various signal processing functions for the L1 layer (i.e., physical layer). The signal processing functions includes coding and interleaving to facilitate forward error correction (FEC) at the UE 850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream is then provided to a different antenna 820 via a separate transmitter 818TX. Each transmitter 818TX modulates an RF carrier with a respective spatial stream for transmission.

At the UE 850, each receiver 854RX receives a signal through its respective antenna 852. Each receiver 854RX recovers information modulated onto an RF carrier and provides the information to the receiver (RX) processor 856.

The RX processor 856 implements various signal processing functions of the L1 layer. The RX processor 856 performs spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 810. These soft decisions may be based on channel estimates computed by the channel estimator 858. The soft decisions are then decoded and deinterleaved to recover the data and control signals that were originally transmitted by the eNB 810 on the physical channel. The data and control signals are then provided to the controller/processor 859.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the core network. The upper layer packets are then provided to a data sink 862, which represents all the protocol layers above the L2 layer. Various control signals may also be provided to the data sink 862 for L3 processing. The controller/processor 859 is also responsible for error detection using an acknowledgement (ACK) and/or negative acknowledgement (NACK) protocol to support HARQ operations.

In the UL, a data source 867 is used to provide upper layer packets to the controller/processor 859. The data source 867 represents all protocol layers above the L2 layer (L2). Similar to the functionality described in connection with the DL transmission by the eNB 810, the controller/processor 859 implements the L2 layer for the user plane and the control plane by providing header compression, ciphering, packet segmentation and reordering, and multiplexing between logical and transport channels based on radio resource allocations by the eNB 810. The controller/processor 859 is also responsible for HARQ operations, retransmission of lost packets, and signaling to the eNB 810.

Channel estimates derived by a channel estimator 858 from a reference signal or feedback transmitted by the eNB 810 may be used by the TX processor 868 to select the appropriate coding and modulation schemes, and to facilitate spatial processing. The spatial streams generated by the TX processor 868 are provided to different antenna 852 via separate transmitters 854TX. Each transmitter 854TX modulates an RF carrier with a respective spatial stream for transmission.

The UL transmission is processed at the eNB 810 in a manner similar to that described in connection with the receiver function at the UE 850. Each receiver 818RX receives a signal through its respective antenna 820. Each receiver 818RX recovers information modulated onto an RF carrier and provides the information to a RX processor 870. The RX processor 870 implements the L1 layer.

The controller/processor 859 implements the L2 layer described earlier in connection with FIG. 7. In the UL, the control/processor 859 provides demultiplexing between transport and logical channels, packet reassembly, deciphering, header decompression, control signal processing to recover upper layer packets from the UE 850. Upper layer packets from the controller/processor 859 may be provided to the core network. The controller/processor 859 is also responsible for error detection using an ACK and/or NACK protocol to support HARQ operations.

The processing system 114 described in relation to FIG. 1 includes the UE 850. In particular, the processing system 114 includes the TX processor 868, the RX processor 856, and the controller/processor 859.

Generally, in an LTE network environment, UEs may perform peer-to-peer (P2P) communications. As described with reference to FIGS. 9-13, various P2P communications schemes may be implemented by through use, re-use, and/or mapping of available LTE channelization structures and waveforms. In one aspect, P2P communications may use TD-LTE frame structures. Further, to support concurrent P2P communications and WAN communications for the duration of P2P direct communications, a TDM resource partitioning structure may be used between P2P communications and WAN communications where certain subframes are used for P2P communications and the other subframes are used WAN communications. In another aspect, to support communications within a P2P group and between P2P groups, a joint TDM/FDM resource partitioning structure may be used. In one aspect, a P2P group includes two or more UEs using P2P communications where one UE may act as a P2P group owner and the other UEs may act as P2P clients. In such an aspect, the function of a P2P group owner, from MAC layer above, is similar to an eNB in the duration of P2P communications, including resource negotiation with WAN/other P2P groups, scheduling inside the P2P group, etc. Further, the function of a P2P client, from MAC layer above, is substantially the same as a general UE. As such, P2P communications that occur between UEs may be considered P2P uplink communications, where a P2P client UE transmits to the P2P group owner UE, or P2P downlink communications, where the P2P group owner UE transmits to one or more P2P client UEs.

Figure 9:
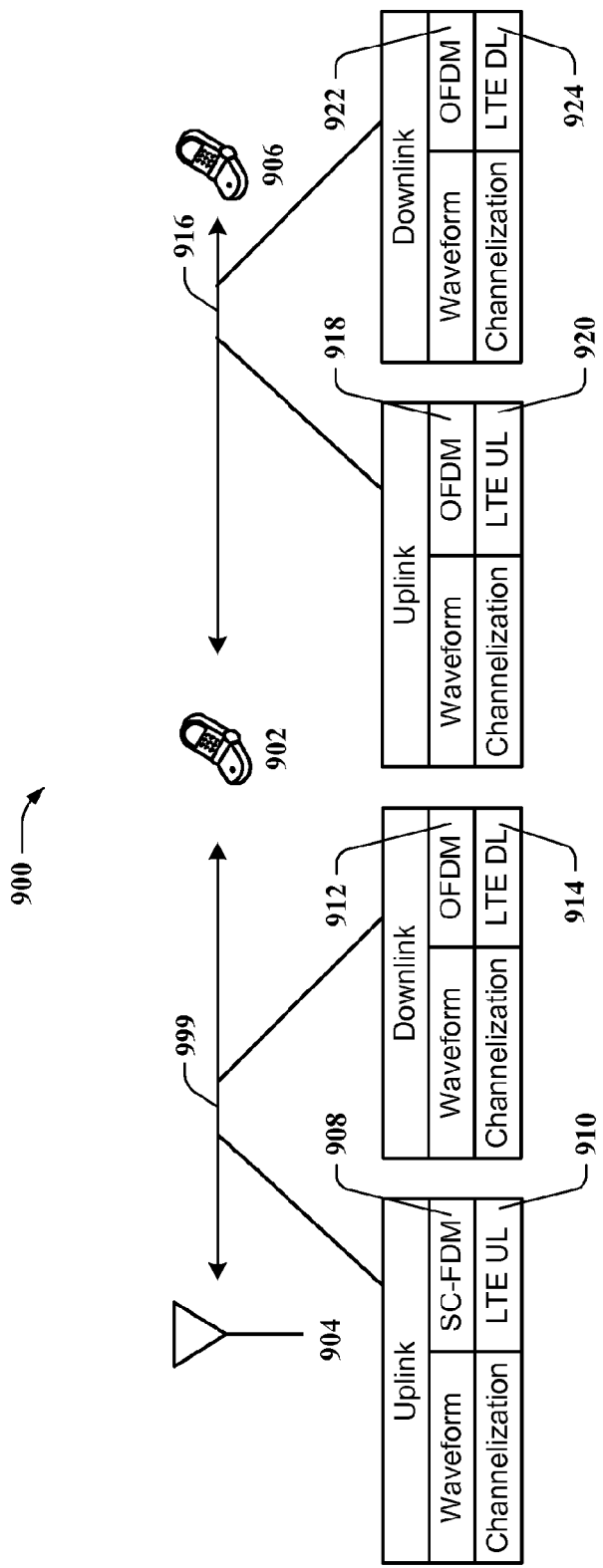
FIG. 9 is a diagram illustrating an example peer-to-peer channelization scheme for use in an access network.

FIG. 9 is a diagram illustrating an example peer-to-peer channelization scheme for communications in an LTE network 900 architecture. LTE network 900 includes UEs 902, 906 and eNB 904. UE 902 may engage in wide area network (WAN) communications 999 with eNB 904 using LTE channelization and waveform structures. Generally, in LTE network 900, WAN communications 999 may be supported through an LTE UL channelization structure 910 using a single-carrier frequency division multiplexing (SC-FDM) waveform 908 for uplink communications, and an LTE DL channelization structure 914 using an orthogonal frequency division multiplexing waveform 912. As used herein, channelization may refer to how a signal is constructed for communication, including such components as, frame structure, physical channel definition, sampling rate, frame/slot duration, number/location of pilot symbols/data symbols, etc. LTE UL channelization structure 910 may include a sounding reference signal (SRS), a PUSCH, PUCCH, and PRACH. Further, LTE DL channelization structure 914 may include primary and secondary synchronization symbols (PSS/SSS), physical broadcast channel (PBCH), PDSCH, physical downlink control channel (PDCCH), physical hybrid ARQ indicator channel (PHICH), physical control format indicator channel (PCFICH), various RSs such as CRS, EU-RS, etc.

Further, UE 902 may engage in P2P communications 916 with UE 906. In one aspect, P2P communications 916 on the downlink may use LTE downlink channelization structures 924 with OFDM waveform 922. P2P communications 916 on the uplink may use LTE uplink channelization structures 920 with OFDM waveform 918. In such an aspect, use of the OFDM waveform 918 for uplink communications creates symmetry between downlink and uplink physical layers. While such an implementation may increase PAPR for uplink communications due to increased power usage in OFDM waveform implements, UE 906 need not perform DFT and inverse DFT (IDFT) associated with SC-FDM communications.

Figure 10:
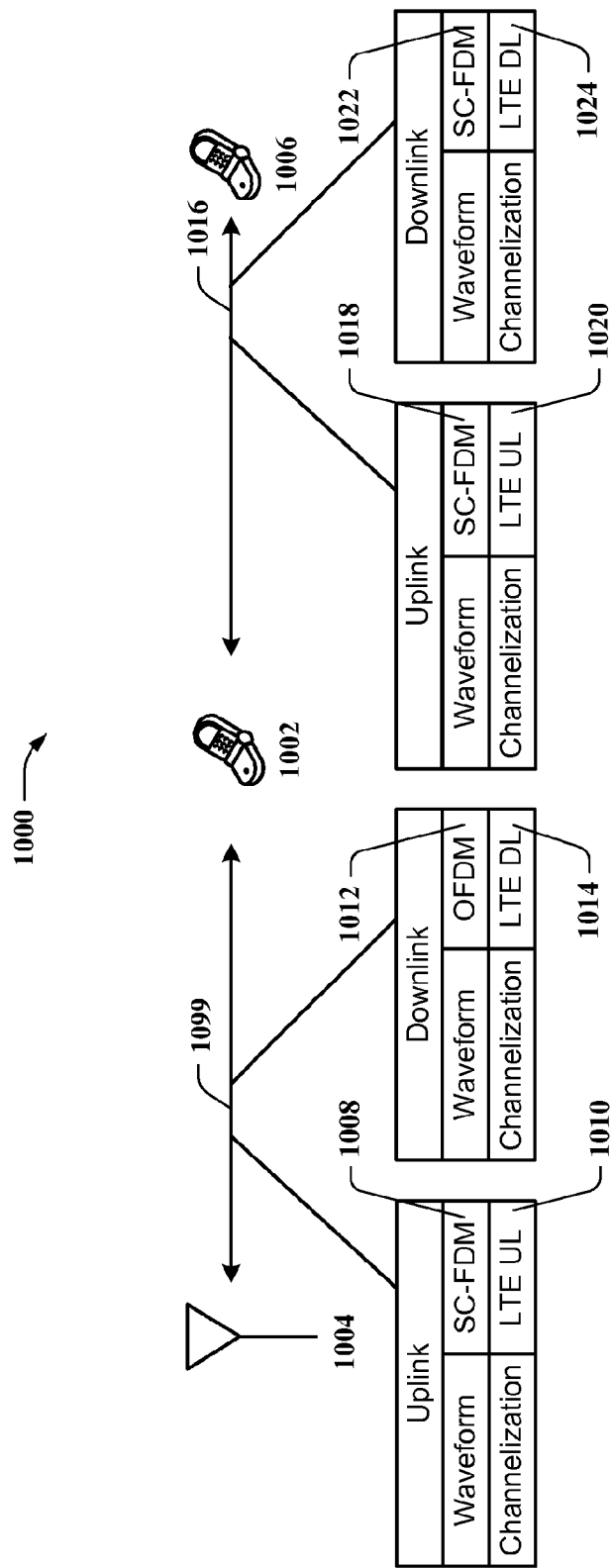
FIG. 10 is a diagram illustrating another example peer-to-peer channelization scheme for use in an access network.

FIG. 10 is a diagram illustrating an example peer-to-peer channelization scheme for communications in an LTE network 1000 architecture. LTE network 1000 includes UEs 1002, 1006 and eNB 1004. UE 1002 may engage in cellular communications 1099 with eNB 1004 using LTE channelization and waveform structures. Generally, in LTE network 1000, communications 1099 are operable to be supported through an LTE UL channelization structure 1010 using a single-carrier frequency division multiplexing (SC-FDM) waveform 1008 for uplink communications, and an LTE DL channelization structure 1014 using an orthogonal frequency division multiplexing waveform 1012.

Further, UE 1002 may engage in P2P communications 1016 with UE 1006. In one aspect, P2P communications 1016 on the downlink may use LTE downlink channelization structures 1024 with SC-FDM waveform 1022. P2P communications 1016 on the uplink may use LTE uplink channelization structures 1020 with SC-FDM waveform 1018. In such an aspect, use of the SC-FDM waveform 1022 for downlink communications creates symmetry between downlink and uplink physical layers. Use of SC-FDM waveform 1022 for downlink communications reduces PAPR for downlink communications, and as such may assist in reduction of potential interference with our communications in the LTE network 1000 environment. Additionally, use of SC-FDM waveform 1022 may limit the size of P2P groups as different types of channels (e.g., (PSS/SSS/PBCH, PDCCH/PHICH/PCFICH, CRS, PDSCH) may not be simultaneously transmitted. As such, allocation of resources to P2P communications may decrease spectrum efficiency. Further, as PDCCH uses a dedicated RS that was available due to use of the OFDM waveform, a dedicated RS may be designed for PDCCH and PBCH when the SC-FDM waveform is used. Such additional design may further diverged P2P communications from the LTE standard.

Figure 11:
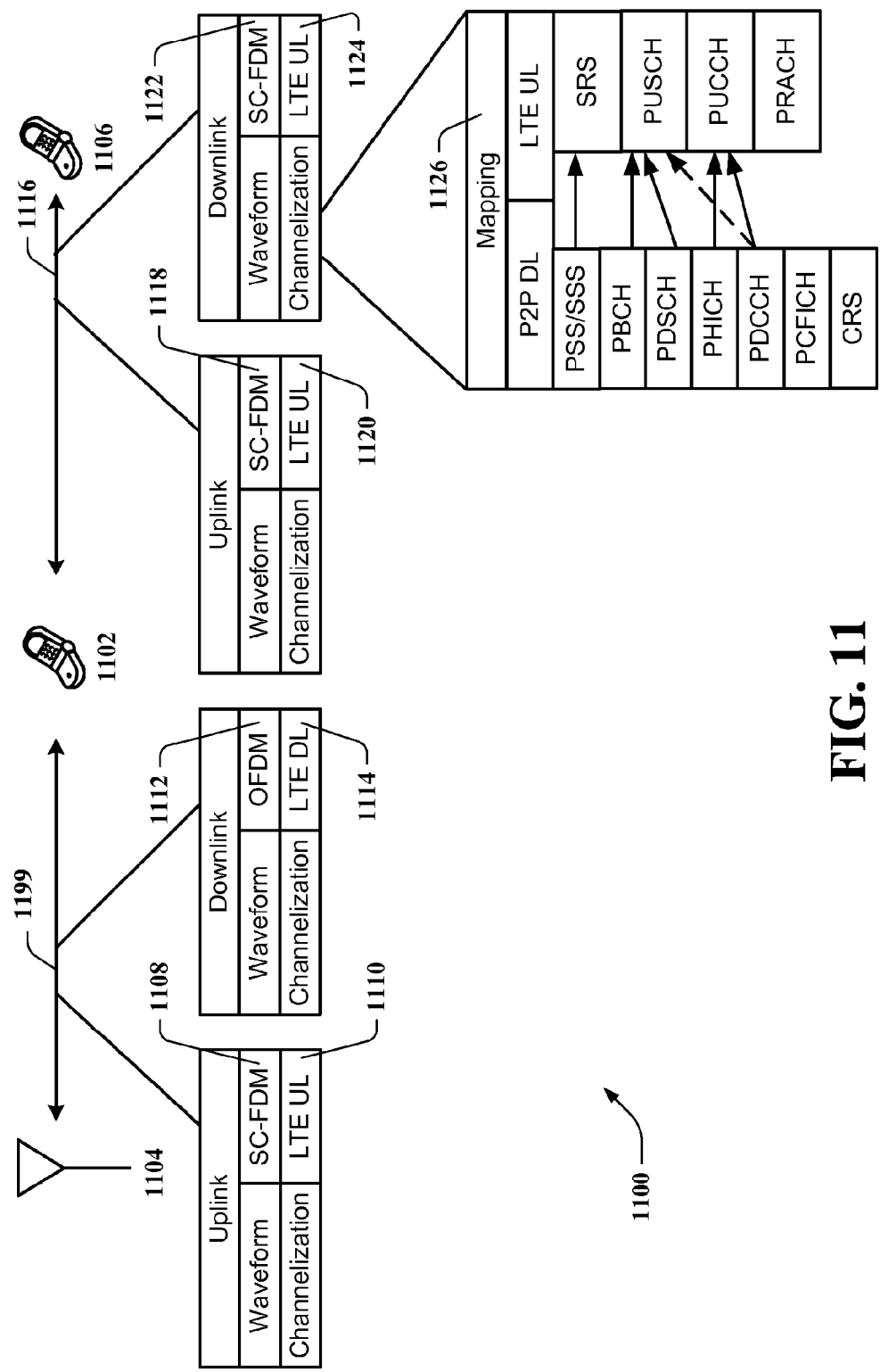
FIG. 11 is a diagram illustrating still another example peer-to-peer channelization scheme for use in an access network.

FIG. 11 is a diagram illustrating an example peer-to-peer channelization scheme for communications in an LTE network 1100 architecture. LTE network 1100 includes UEs 1102, 1106 and eNB 1104. UE 1102 may engage in cellular communications 1199 with eNB 1104 using LTE channelization and waveform structures. Generally, in LTE network 1100, communications 1199 are operable to be supported through an LTE UL channelization structure 1110 using a single-carrier frequency division multiplexing (SC-FDM) waveform 1108 for uplink communications, and an LTE DL channelization structure 1114 using an orthogonal frequency division multiplexing waveform 1112.

Further, UE 1102 may engage in P2P communications 1116 with UE 1106. In one aspect, P2P communications 1116 on the downlink may use LTE uplink channelization structures 1124 with SC-FDM waveform 1122. P2P communications 1116 on the uplink may use LTE uplink channelization structures 1120 with SC-FDM waveform 1118. In such an aspect, use of the SC-FDM waveform 1122 for downlink communications creates symmetry between downlink and uplink physical layers. As the LTE uplink channelization is used for communication of the P2P downlink signals, a mapping 1126 scheme may be implemented to map P2P downlink channelization to LTE UL channelization. For example, mapping 1126 may map P2P DL PSS/SSS to LTE UL SRS. In such a mapping 1126 implementation, UEs 1102, 1106 may obtain synchronization information from the SRS, where the UEs 1102, 1106 are synchronized with a WAN network. Mapping 1126 further maps P2P DL PBCH, PDSCH, and optionally PDCCH to LTE UL PUSCH. In such a mapping 1126 implementation, PBCH may be mapped using fixed RB locations and fixed payload lengths. Further, as P2P communications 1116 use a SC-FDM waveform 1118, 1122, when PBCH is transmitted, no other data/control channel can be transmitted. Such a limitation may not optimally use resources and may interfere with HARQ communication timing. Further, use of SC-FDM waveform 1118, 1122 limit the number of UEs that are client UEs to a P2P group owner as two UEs may not simultaneously transmit when the SC-FDM waveform 1118, 1122 is used. Mapping 1126 further maps P2P DL PHICH to ACK resources in LTE UL PUCCH. Mapping 1126 further maps P2P DL PDCCH to CQI resources in LTE UL PUCCH, assuming PDCCH uses less than or equal to 11 bits of payload size. Where PDCCH may use more than 11 bits to communicate control information, P2P DL PDCCH may be mapped to reserved RB locations in LTE UL PUSCH. Furthermore, PDCCH may be mapped to reserved RB locations in LTE UL PUSCH for any control information payload size. Still further P2P DL PDCCH information may be mapped to both reserved RB locations in LTE UL PUSCH and CQI resources in LTE UL PUCCH. As channels provided in LTE UL channelization 1124 include demodulation RSs (DRSs), P2P DL CRS does not needed to be mapped to any LTE UL resources. Similarly, no mapping may be needed for P2P DL PCFICH.

Figure 12:
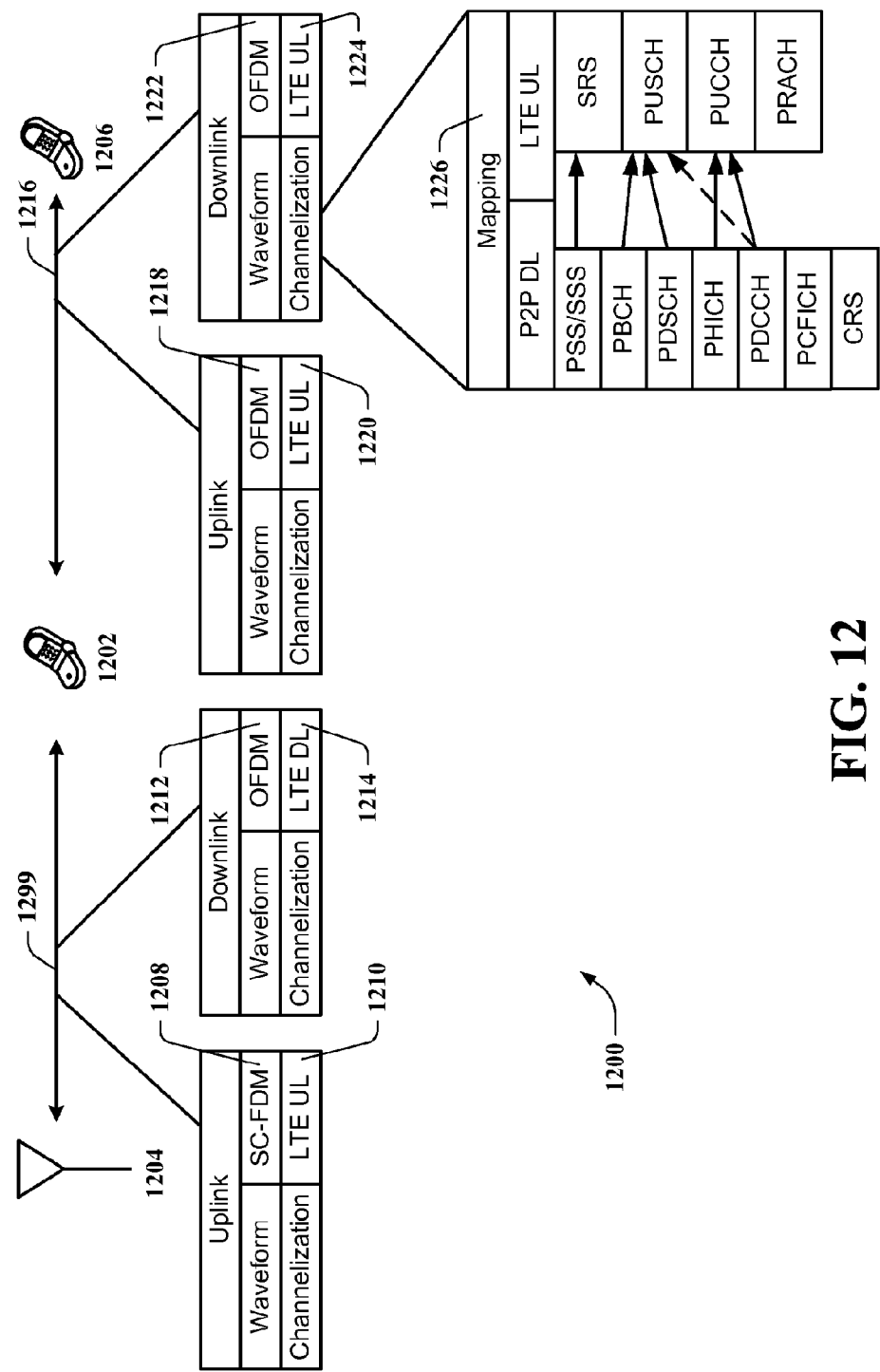
FIG. 12 is a diagram illustrating yet another example peer-to-peer channelization scheme for use in an access network.

FIG. 12 is a diagram illustrating an example peer-to-peer channelization scheme for communications in an LTE network 1200 architecture. LTE network 1200 includes UEs 1202, 1206 and eNB 1204. UE 1202 may engage in cellular communications 1299 with eNB 1204 using LTE channelization and waveform structures. Generally, in LTE network 1200, communications 1299 are operable to be supported through an LTE UL channelization structure 1210 using a single-carrier frequency division multiplexing (SC-FDM) waveform 1208 for uplink communications, and an LTE DL channelization structure 1214 using an orthogonal frequency division multiplexing waveform 1212.

Further, UE 1202 may engage in P2P communications 1216 with UE 1206. In one aspect, P2P communications 1216 on the downlink may use LTE uplink channelization structures 1224 with OFDM waveform 1222. P2P communications 1216 on the uplink may use LTE uplink channelization structures 1220 with OFDM waveform 1218. In such an aspect, use of the OFDM waveform 1222 for uplink communications creates symmetry between downlink and uplink physical layers. By contrast to the implementation depicted in FIG. 11, multiple clients UEs may be supports in a P2P group due to use of the OFDM waveform.

As the LTE uplink channelization is used for communication of the P2P downlink signals, a mapping 1226 scheme may be implemented to map P2P downlink channelization to LTE UL channelization. For example, mapping 1226 may map P2P DL PSS/SSS to LTE UL SRS. In such a mapping 1226 implementation, UEs 1202, 1206 may obtain synchronization information from the SRS, where the UEs 1202, 1206 are synchronized with a WAN network. Mapping 1226 further maps P2P DL PBCH, PDSCH, and optionally PDCCH to LTE UL PUSCH. In such a mapping 1226 implementation, PBCH may be mapped using fixed RB locations and fixed payload lengths. Further, as P2P communications 1216 use a SC-FDM waveform 1218, 1222, when PBCH is transmitted, no other data/control channel can be transmitted. Such a limitation may not optimally use resources and may interfere with HARQ communication timing. Further, use of SC-FDM waveform 1218, 1222 limit the number of UEs that are client UEs to a P2P group owner as two UEs may not simultaneously transmit when the SC-FDM waveform 1218, 1222 is used. Mapping 1226 further maps P2P DL PHICH to ACK resources in LTE UL PUCCH. Mapping 1226 further maps P2P DL PDCCH to CQI resources in LTE UL PUCCH, assuming PDCCH uses less than or equal to 12 bits of payload size. Where PDCCH may use more than 12 bits to communicate control information, P2P DL PDCCH may be mapped to reserved RB locations in LTE UL PUSCH. As channels provided in LTE UL channelization 1224 include demodulation RSs (DRSs), P2P DL CRS does not needed to be mapped to any LTE UL resources. Similarly, no mapping may be needed for P2P DL PCFICH.

Figure 13:
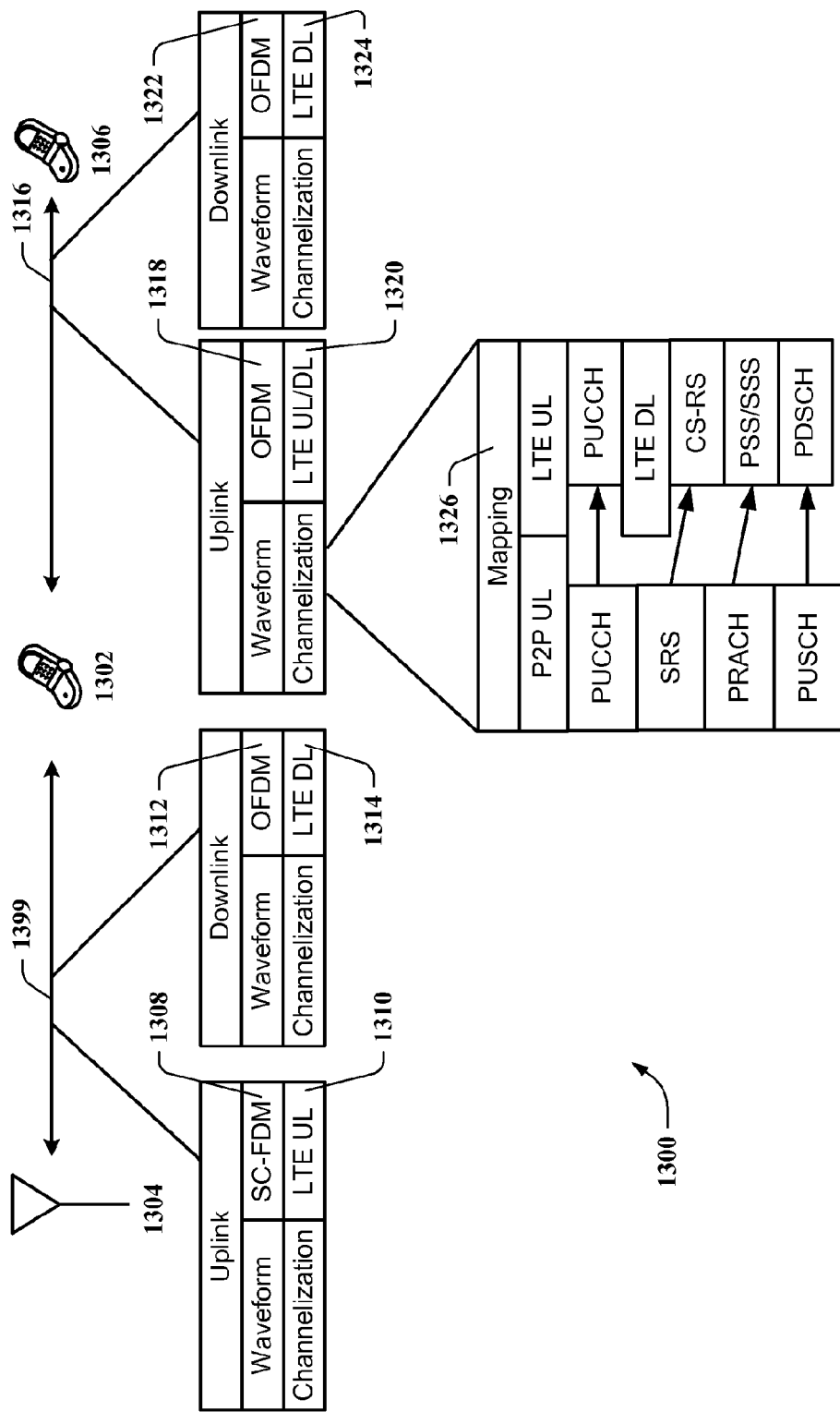
FIG. 13 is a diagram illustrating an additional example peer-to-peer channelization scheme for use in an access network.

FIG. 13 is a diagram illustrating an example peer-to-peer channelization scheme for communications in an LTE network 1300 architecture. LTE network 1300 includes UEs 1302, 1306 and eNB 1304. UE 1302 may engage in cellular communications 1399 with eNB 1304 using LTE channelization and waveform structures. Generally, in LTE network 1300, communications 1399 are operable to be supported through an LTE UL channelization structure 1310 using a single-carrier frequency division multiplexing (SC-FDM) waveform 1308 for uplink communications, and an LTE DL channelization structure 1314 using an orthogonal frequency division multiplexing waveform 1312.

Further, UE 1302 may engage in P2P communications 1316 with UE 1306. In one aspect, P2P communications 1316 on the downlink may use LTE downlink channelization structures 1324 with OFDM waveform 1322. P2P communications 1316 on the uplink may use a combination of LTE uplink and downlink channelization structures 1320 with OFDM waveform 1318. In such an aspect, use of the OFDM waveform 1322 for uplink communications creates symmetry between downlink and uplink physical layers.

As a combination of LTE uplink and downlink channelization is used for communication of the P2P downlink signals, a mapping 1326 scheme may be implemented to map P2P uplink channelization to LTE UL and DL channelization. For example, mapping 1326 may map P2P UL PUCCH to LTE UL PUCCH. Mapping 1326 further maps P2P UL SRS may be mapped to a cell specific RS (CS-RS) in LTE DL channelization. Mapping 1326 further maps P2P UL PRACH to LTE DL PSS/SSS. Mapping 1326 further maps P2P UL PUSCH to LTE DL PDSCH with dedicated RSs. In such an implementation, P2P DL channels CRS, PCFICH/PHICH/PDCCH need not be mapped, and as such may result in improved interference control better P2P groups.

One may note that the implements discussed in FIGS. 9-13 relate to physical layer channelization organization and/or allocation and may be independent of MAC layer design. Although for simplicity P2P UEs are distinguished as group owners and clients in MAC+ layer, design in physical layer may be extended to cover where there is no differentiation of group owner and clients, and all P2P UEs are symmetric in their MAC+ layer.

Figure 14:
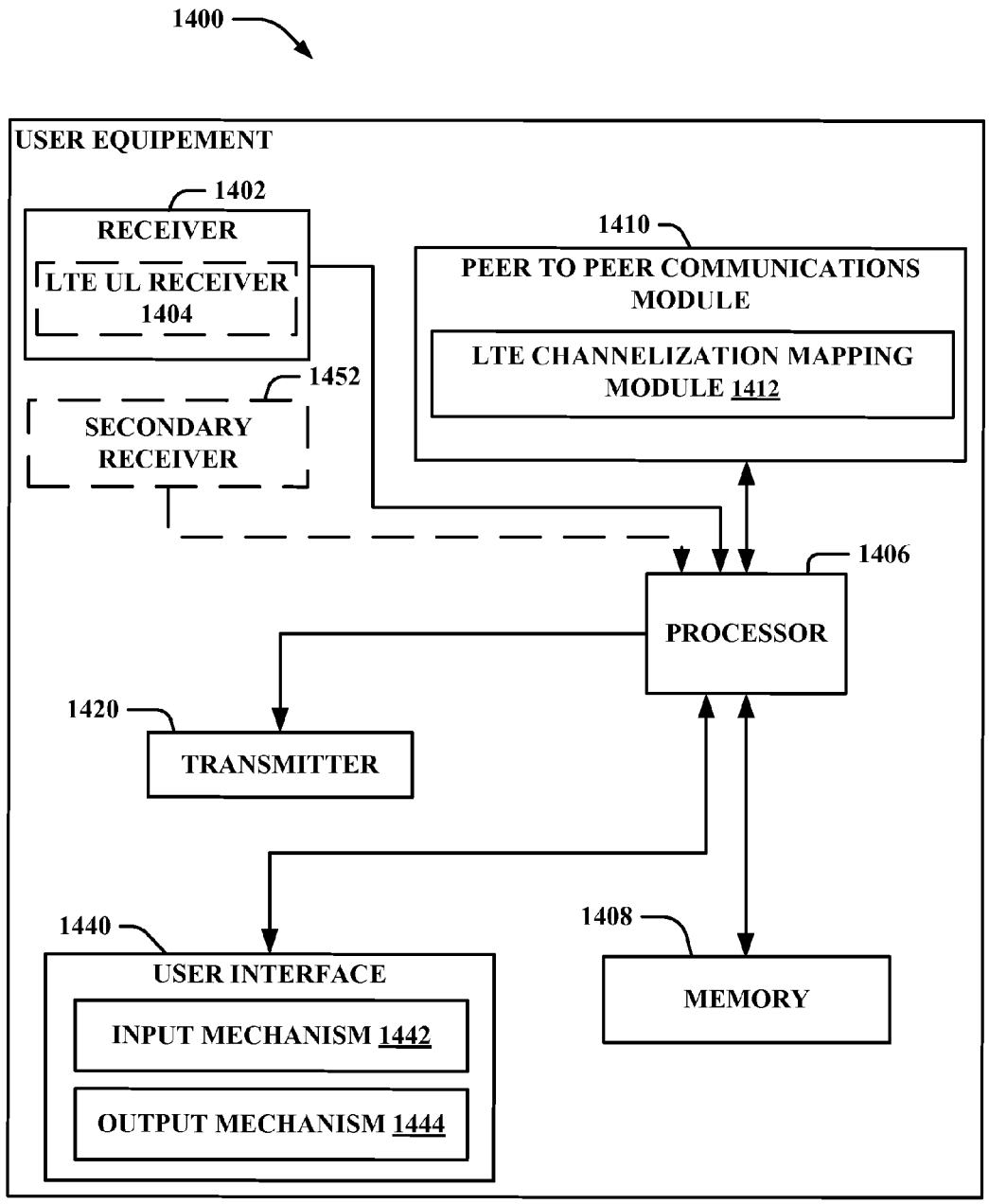
FIG. 14 is a diagram illustrating a block diagram of an example UE for implementing peer-to-peer channelization schemes, according to an aspect.

FIG. 14 illustrates of a user equipment (UE) 1400 (e.g. a client device, wireless communications device (WCD), etc.) that assist in facilitating P2P communications using LTE based channelization structures and waveforms. UE 1400 comprises receiver 1402 that receives one or more signal from, for instance, one or more receive antennas (not shown), performs typical actions on (e.g., filters, amplifies, downconverts, etc.) the received signal, and digitizes the conditioned signal to obtain samples. Receiver 1402 can further comprise an oscillator that can provide a carrier frequency for demodulation of the received signal and a demodulator that can demodulate received symbols and provide them to processor 1406 for channel estimation. In one aspect, UE 1400 may further comprise secondary receiver 1452 and may receive additional channels of information. Further, in one aspect, receiver 1402 and/or secondary receiver 1452 may include an LTE UL receiver 1404. LTE UL receiver 1404 may be operable to receive one or more signals communicated using an at least a portion of an LTE UL channelization. For example, LTE UL receiver 1404 may be operable to receive all LTE UL channels (e.g., PRACH, PUCCH, PUSCH, SRS) or a portion of LTE UL channels (e.g., PUCCH).

Processor 1406 can be a processor dedicated to analyzing information received by receiver 1402 and/or generating information for transmission by one or more transmitters 1420 (for ease of illustration, only one transmitter is shown), a processor that controls one or more components of UE 1400, and/or a processor that both analyzes information received by receiver 1402 and/or receiver 1452, generates information for transmission by transmitter 1420 for transmission on one or more transmitting antennas (not shown), and controls one or more components of UE 1400.

In one aspect, alone or in combination, processor 1406, receiver (1402, 1452), and transmitter 1420 may provide means for receiving first peer-to-peer communications using a first network communication channelization and a waveform, and means for transmitting second peer-to-peer communications using a second network communication channelization and the waveform.

UE 1400 can additionally comprise memory 1408 that is operatively coupled to processor 1406 and that can store data to be transmitted, received data, information related to available channels, data associated with analyzed signal and/or interference strength, information related to an assigned channel, power, rate, or the like, and any other suitable information for estimating a channel and communicating via the channel. Memory 1408 can additionally store channelization mapping configurations to enable UE 1400 to perform P2P communications using LTE channelization structures and waveforms.

It will be appreciated that the data store (e.g., memory 1408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1408 of the subject systems and methods is intended to comprise, without being limited to, these and any other suitable types of memory.

UE 1400 can further peer-to-peer communications module 1410. Peer-to-peer communications module 1410 may include LTE channelization mapping module 1412. In one aspect, peer-to-peer communications module 1410 may be operable to enable UE 1400 to perform P2P communications using LTE channelization structures and waveforms. LTE channelization mapping module 1412 may include LTE channelization mapping configurations to allow P2P communications as depicted, for example, in FIGS. 11-13. Operation of peer-to-peer communications module 1410 is depicted in the flowchart of FIG. 15.

Additionally, UE 1400 may include user interface 1440. User interface 1440 may include input mechanisms 1442 for generating inputs into UE 1400, and output mechanism 1444 for generating information for consumption by the user of UE 1400. For example, input mechanism 1442 may include a mechanism such as a key or keyboard, a mouse, a touchscreen display, a microphone, etc. Further, for example, output mechanism 1444 may include a display, an audio speaker, a haptic feedback mechanism, a Personal Area Network (PAN) transceiver etc. In the illustrated aspects, output mechanism 1444 may include a display operable to present content that is in image or video format or an audio speaker to present content that is in an audio format.

Figure 15:
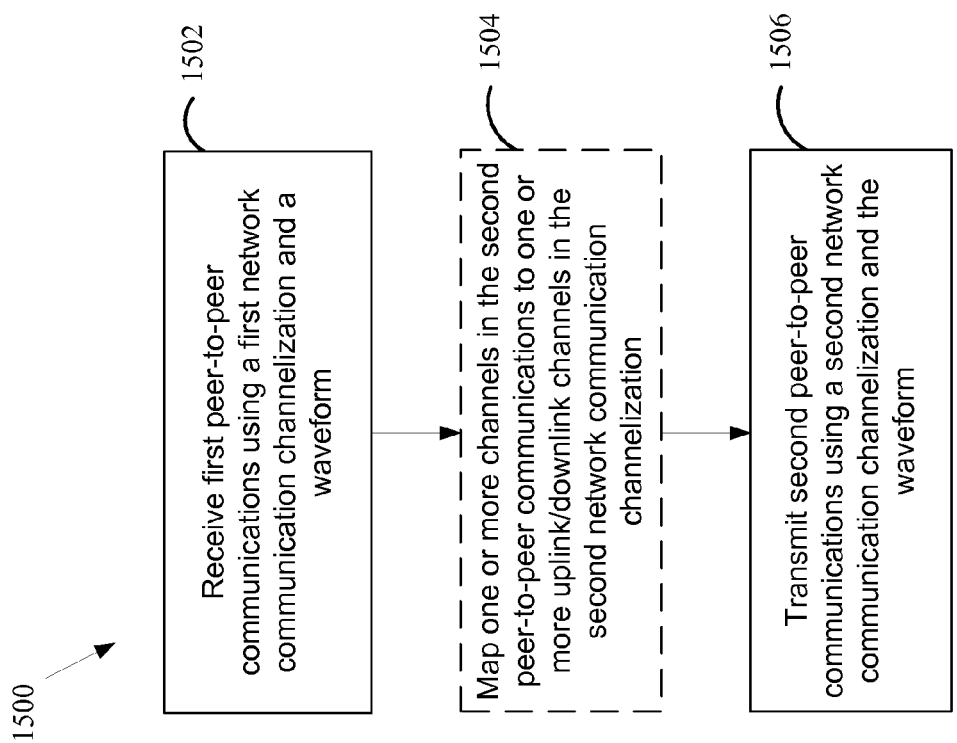
FIG. 15 is a flow chart of a method of wireless communication.

FIG. 15 is a flow chart 1500 of a method of wireless communication. The method may receive first peer-to-peer communications using a first network communication channelization and a waveform (1502). In one aspect, the first network communication channelization is an LTE downlink channelization or an LTE uplink channelization. In one aspect, the waveform may include OFDM or SC-FDM. In addition, in an optional aspect, the method may map one or more channels in the second peer-to-peer communications to one or more uplink and/or downlink channels in the second network communication channelization (1504). In such an optional aspect, downlink channelization mapping may include mapping a synchronization signal to sounding reference signal resources in the LTE uplink channelization, mapping a broadcast channel signal to shared data channel resources in the LTE uplink channelization, mapping a downlink control channel signal to at least one of shared data channel resources or control channel resources in the LTE uplink channelization. In one such aspect, where a downlink control channel has 11 bits or less of payload, LTE UL control channel resources may be used for mapping purposes. Where a downlink control channel has greater than 11 bits of payload, LTE UL shared data channel resources may be used for mapping purposes. Furthermore, PDCCH may be mapped to reserved RB locations in LTE UL PUSCH for any control information payload size. Still further P2P DL PDCCH information may be mapped to both reserved RB locations in LTE UL PUSCH and CQI resources in LTE UL PUCCH. In the optional aspect, uplink channelization mapping may include mapping one or more channels in the second peer-to-peer communications to one or more downlink channels. In the optional aspect, a combination of uplink and downlink channelization mapping may include mapping a random access signal to synchronization signal resources in the LTE downlink channelization, mapping a sounding reference signal to common reference signal resources in the LTE downlink channelization, mapping an uplink shared channel signal to downlink shared channel resources in the LTE downlink channelization. Furthermore, the method may transmit second peer-to-peer communications using a second network communication channelization and the waveform (1506). In one aspect, the second peer-to-peer communications over a downlink connection and the second network communication channelization corresponds to an uplink channelization. In another aspect, the second peer-to-peer communications over an uplink connection and the second network communication channelization corresponds to a downlink channelization. In another aspect, the second network communication channelization is an LTE uplink channelization. In another aspect, the second network communication channelization includes at least a portion of an LTE uplink channelization and an LTE downlink channelization.

Figure 16:
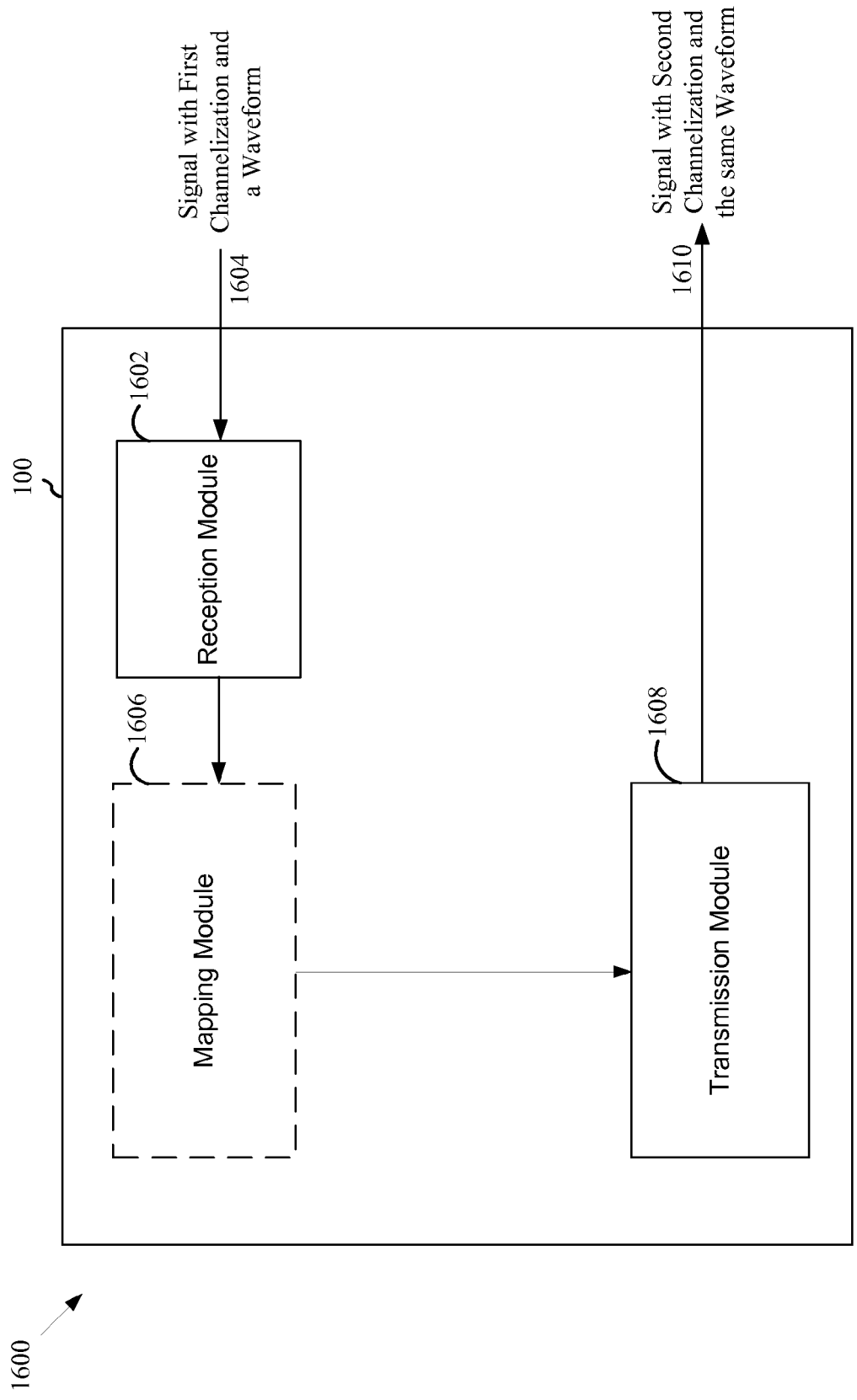
FIG. 16 is a conceptual block diagram illustrating the functionality of an exemplary apparatus.

FIG. 16 is a conceptual block diagram 1600 illustrating the functionality of an exemplary apparatus 100. The apparatus 100 includes a reception module 1602 that receives first peer-to-peer communications 1604 using a first network communication channelization and a waveform. In an optional aspect, the apparatus 100 includes a mapping module 1606 that maps one or more channels in the second peer-to-peer communications to one or more uplink channels and/or downlink channels in the second network communication channelization. Further, the apparatus 100 includes a transmission module 1608 that transmits second peer-to-peer communications 1610 using a second network communication channelization and the same waveform. The apparatus 100 may include additional modules that perform each of the steps in the aforementioned flow charts. As such, each step in the aforementioned flow charts may be performed by a module and the apparatus 100 may include one or more of those modules.

In one configuration, the apparatus 100 for wireless communication includes means for receiving first peer-to-peer communications using a first network communication channelization and a waveform, and means for transmitting second peer-to-peer communications using a second network communication channelization and the waveform. In another configuration, the means for transmitting in apparatus 100 include means for transmitting the second peer-to-peer communications over a downlink connection, wherein the second network communication channelization corresponds to an uplink channelization. In another configuration, the apparatus 100 for wireless communication further includes means for mapping one or more channels in the second peer-to-peer communications to one or more uplink channels in the second network communication channelization. In another configuration, the apparatus 100 for wireless communication further includes means for mapping a synchronization signal to sounding reference signal resources in the LTE uplink channelization for transmitting in the second peer-to-peer communications. In another configuration, the apparatus 100 for wireless communication further includes means for mapping a broadcast channel signal to shared data channel resources in the LTE uplink channelization for transmitting in the second peer-to-peer communications. In another configuration, the apparatus 100 for wireless communication further includes means for mapping a downlink control channel signal to at least one of shared data channel resources or control channel resources in the LTE uplink channelization for transmitting in the second peer-to-peer communications. In another configuration, the means for transmitting in apparatus 100 include means for transmitting the second peer-to-peer communications over an uplink connection, wherein the second network communication channelization corresponds to a downlink channelization. In another configuration, the apparatus 100 for wireless communication further includes means for mapping one or more channels in the second peer-to-peer communications to one or more downlink channels in the second network communication channelization. In another configuration, the apparatus 100 for wireless communication further includes means for mapping one or more channels in the second peer-to-peer communications to one or more downlink channels in the second network communication channelization. In another configuration, the apparatus 100 for wireless communication further includes means for mapping a random access signal to synchronization signal resources in the LTE downlink channelization for transmitting in the second peer-to-peer communications. In another configuration, the apparatus 100 for wireless communication further includes means for mapping a sounding reference signal to common reference signal resources in the LTE downlink channelization for transmitting in the second peer-to-peer communications. In another configuration, the apparatus 100 for wireless communication further includes means for mapping an uplink shared channel signal to downlink shared channel resources in the LTE downlink channelization for transmitting in the second peer-to-peer communications. The aforementioned means may be one or more of the aforementioned modules of the apparatus 100 (see FIG. 14) and/or the processing system 114 configured to perform the functions recited by the aforementioned means. As described supra, the processing system 114 includes the TX Processor 868, the RX Processor 856, and the controller/processor 859. As such, in one configuration, the aforementioned means may be the TX Processor 868, the RX Processor 856, and the controller/processor 859 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving first peer-to-peer communications using a first network communication channelization and a waveform;
   transmitting second peer-to-peer communications over a downlink connection using a second network communication channelization and the waveform, wherein the second network communication channelization corresponds to an uplink channelization; and
   mapping a synchronization signal to sounding reference signal resources in the uplink channelization for transmitting in the second peer-to-peer communications.

2. The method of claim 1, further comprising mapping one or more channels in the second peer-to-peer communications to one or more uplink channels in the second network communication channelization.

3. The method of claim 1, wherein the second network communication channelization is an LTE uplink channelization.

4. The method of claim 3, further comprising mapping a broadcast channel signal to shared data channel resources in the LTE uplink channelization for transmitting in the second peer-to-peer communications.

5. The method of claim 3, further comprising mapping a downlink control channel signal to at least one of shared data channel resources or control channel resources in the LTE uplink channelization for transmitting in the second peer-to-peer communications.

6. The method of claim 5, wherein the control channel resources are used for mapping the downlink control channel signal when the downlink control channel signal includes less than or equal to 11 bits of payload.

7. The method of claim 5, wherein the shared data channel resources are used for mapping the downlink control channel signal for any bit size payload.

8. The method of claim 3, wherein the first network communication channelization is an LTE downlink channelization or an LTE uplink channelization.

9. The method of claim 1, wherein the waveform comprises OFDM or SC-FDM.

10. A method of wireless communication, comprising:
    receiving first peer-to-peer communications using a first network communication channelization and a waveform;

transmitting second peer-to-peer communications over an uplink connection using a second network communication channelization and the waveform, wherein the second network communication channelization corresponds to a downlink channelization; and mapping a sounding reference signal to common reference signal resources in the downlink channelization for transmitting in the second peer-to-peer communications.

11. The method of claim 10, further comprising mapping one or more channels in the second peer-to-peer communications to one or more downlink channels in the second network communication channelization.

12. The method of claim 10, wherein the second network communication channelization further corresponds at least in part to an uplink channelization.

13. The method of claim 12, wherein the second network communication channelization comprises at least a portion of an LTE uplink channelization and an LTE downlink channelization.

14. The method of claim 13, further comprising mapping a random access signal to synchronization signal resources in the LTE downlink channelization for transmitting in the second peer-to-peer communications.

15. The method of claim 13, further comprising mapping an uplink shared channel signal to downlink shared channel resources in the LTE downlink channelization for transmitting in the second peer-to-peer communications.

16. The method of claim 15, wherein dedicated reference signals in the LTE downlink channelization are used for channel estimation for the uplink shared channel signal.

17. The method of claim 10, wherein the second network communication channelization is an LTE downlink channelization, and the first network communication channelization is an LTE downlink channelization or an LTE uplink channelization.

18. An apparatus for wireless communication, comprising:
means for receiving first peer-to-peer communications using a first network communication channelization and a waveform;
means for transmitting second peer-to-peer communications over a downlink connection using a second network communication channelization and the waveform, wherein the second network communication channelization corresponds to an uplink channelization; and
means for mapping a synchronization signal to sounding reference signal resources in the uplink channelization for transmitting in the second peer-to-peer communications.

19. The apparatus of claim 18, further comprising means for mapping one or more channels in the second peer-to-peer communications to one or more uplink channels in the second network communication channelization.

20. The apparatus of claim 18, wherein the second network communication channelization is an LTE uplink channelization.

21. The apparatus of claim 20, further comprising means for mapping a broadcast channel signal to shared data channel resources in the LTE uplink channelization for transmitting in the second peer-to-peer communications.

22. The apparatus of claim 20, further comprising means for mapping a downlink control channel signal to at least one of shared data channel resources or control channel resources in the LTE uplink channelization for transmitting in the second peer-to-peer communications.

23. The apparatus of claim 22, wherein the control channel resources are used for mapping the downlink control channel signal when the downlink control channel signal includes less than or equal to 11 bits of payload.

24. The apparatus of claim 22, wherein the shared data channel resources are used for mapping the downlink control channel signal for any bit size payload.

25. The apparatus of claim 20, wherein the first network communication channelization is an LTE downlink channelization or an LTE uplink channelization.

26. The apparatus of claim 18, wherein the waveform comprises OFDM or SC-FDM.

27. An apparatus for wireless communication, comprising:
means for receiving first peer-to-peer communications using a first network communication channelization and a waveform;
means for transmitting second peer-to-peer communications over an uplink connection using a second network communication channelization and the waveform, wherein the second network communication channelization corresponds to a downlink channelization; and
means for mapping a sounding reference signal to common reference signal resources in the downlink channelization for transmitting in the second peer-to-peer communications.

28. The apparatus of claim 27, further comprising means for mapping one or more channels in the second peer-to-peer communications to one or more downlink channels in the second network communication channelization.

29. The apparatus of claim 27, wherein the second network communication channelization further corresponds at least in part to an uplink channelization.

30. The apparatus of claim 29, wherein the second network communication channelization comprises at least a portion of an LTE uplink channelization and an LTE downlink channelization.

31. The apparatus of claim 30, further comprising means for mapping a random access signal to synchronization signal resources in the LTE downlink channelization for transmitting in the second peer-to-peer communications.

32. The apparatus of claim 30, further comprising means for mapping an uplink shared channel signal to downlink shared channel resources in the LTE downlink channelization for transmitting in the second peer-to-peer communications.

33. The apparatus of claim 32, wherein dedicated reference signals in the LTE downlink channelization are used for channel estimation for the uplink shared channel signal.

34. The apparatus of claim 27, wherein the second network communication channelization is an LTE downlink channelization, and the first network communication channelization is an LTE downlink channelization or an LTE uplink channelization.

35. A computer program product, comprising:
a non-transitory computer-readable medium comprising code for:
receiving first peer-to-peer communications using a first network communication channelization and a waveform;
transmitting second peer-to-peer communications over a downlink connection using a second network communication channelization and the waveform, wherein the second network communication channelization corresponds to an uplink channelization; and
mapping a synchronization signal to sounding reference signal resources in the uplink channelization for transmitting in the second peer-to-peer communications.

36. The computer program product of claim 35, wherein the computer-readable medium further comprises code for mapping one or more channels in the second peer-to-peer communications to one or more uplink channels in the second network communication channelization.

37. The computer program product of claim 35, wherein the second network communication channelization is an LTE uplink channelization.

38. The computer program product of claim 37, wherein the computer-readable medium further comprises code for mapping a broadcast channel signal to shared data channel resources in the LTE uplink channelization for transmitting in the second peer-to-peer communications.

39. The computer program product of claim 37, wherein the computer-readable medium further comprises code for mapping a downlink control channel signal to at least one of shared data channel resources or control channel resources in the LTE uplink channelization for transmitting in the second peer-to-peer communications.

40. The computer program product of claim 39, wherein the control channel resources are used for mapping the downlink control channel signal when the downlink control channel signal includes less than or equal to 11 bits of payload.

41. The computer program product of claim 39, wherein the shared data channel resources are used for mapping the downlink control channel signal for any bit size payload.

42. The computer program product of claim 37, wherein the first network communication channelization is an LTE downlink channelization or an LTE uplink channelization.

43. The computer program product of claim 35, wherein the waveform comprises OFDM or SC-FDM.

44. A computer program product, comprising:
a non-transitory computer-readable medium comprising code for:
receiving first peer-to-peer communications using a first network communication channelization and a waveform;
transmitting second peer-to-peer communications over an uplink connection using a second network communication channelization and the waveform, wherein the second network communication channelization corresponds to a downlink channelization; and
mapping a sounding reference signal to common reference signal resources in the downlink channelization for transmitting in the second peer-to-peer communications.

45. The computer program product of claim 44, wherein the computer-readable medium further comprises code for mapping one or more channels in the second peer-to-peer communications to one or more downlink channels in the second network communication channelization.

46. The computer program product of claim 44, wherein the second network communication channelization further corresponds at least in part to an uplink channelization.

47. The computer program product of claim 46, wherein the second network communication channelization comprises at least a portion of an LTE uplink channelization and an LTE downlink channelization.

48. The computer program product of claim 47, wherein the computer-readable medium further comprises code for mapping a random access signal to synchronization signal resources in the LTE downlink channelization for transmitting in the second peer-to-peer communications.

49. The computer program product of claim 47, wherein the computer-readable medium further comprises code for mapping an uplink shared channel signal to downlink shared channel resources in the LTE downlink channelization for transmitting in the second peer-to-peer communications.

50. The computer program product of claim 49, wherein dedicated reference signals in the LTE downlink channelization are used for channel estimation for the uplink shared channel signal.

51. The computer program product of claim 44, wherein the second network communication channelization is an LTE downlink channelization, and the first network communication channelization is an LTE downlink channelization or an LTE uplink channelization.

52. An apparatus for wireless communication, comprising:
a processing system configured to:
receive first peer-to-peer communications using a first network communication channelization and a waveform;
transmit second peer-to-peer communications over a downlink connection using a second network communication channelization and the waveform, wherein the second network communication channelization corresponds to an uplink channelization; and
map a synchronization signal to sounding reference signal resources in the LTE uplink channelization for transmitting in the second peer-to-peer communications.

53. The apparatus of claim 52, wherein the processing system is further configured to map one or more channels in the second peer-to-peer communications to one or more uplink channels in the second network communication channelization.

54. The apparatus of claim 52, wherein the second network communication channelization is an LTE uplink channelization.

55. The apparatus of claim 54, wherein the processing system is further configured to map a broadcast channel signal to shared data channel resources in the LTE uplink channelization for transmitting in the second peer-to-peer communications.

56. The apparatus of claim 54, wherein the processing system is further configured to map a downlink control channel signal to at least one of shared data channel resources or control channel resources in the LTE uplink channelization for transmitting in the second peer-to-peer communications.

57. The apparatus of claim 56, wherein the control channel resources are used for mapping the downlink control channel signal when the downlink control channel signal includes less than or equal to 11 bits of payload.

58. The apparatus of claim 56, wherein the shared data channel resources are used for mapping the downlink control channel signal for any bit size payload.

59. The apparatus of claim 54, wherein the first network communication channelization is an LTE downlink channelization or an LTE uplink channelization.

60. The apparatus of claim 52, wherein the waveform comprises OFDM or SC-FDM.

61. An apparatus for wireless communication, comprising:
a processing system configured to:
receive first peer-to-peer communications using a first network communication channelization and a waveform;
transmit second peer-to-peer communications over an uplink connection using a second network communication channelization and the waveform, wherein the second network communication channelization corresponds to a downlink channelization; and
map a sounding reference signal to common reference signal resources in the LTE downlink channelization for transmitting in the second peer-to-peer communications.

62. The apparatus of claim 61, wherein the processing system is further configured to map one or more channels in the second peer-to-peer communications to one or more downlink channels in the second network communication channelization.

63. The apparatus of claim 61, wherein the second network communication channelization further corresponds at least in part to an uplink channelization.

64. The apparatus of claim 63, wherein the second network communication channelization comprises at least a portion of an LTE uplink channelization and an LTE downlink channelization.

65. The apparatus of claim 64, wherein the processing system is further configured to map a random access signal to synchronization signal resources in the LTE downlink channelization for transmitting in the second peer-to-peer communications.

66. The apparatus of claim 64, wherein the processing system is further configured to map an uplink shared channel signal to downlink shared channel resources in the LTE downlink channelization for transmitting in the second peer-to-peer communications.

67. The apparatus of claim 66, wherein dedicated reference signals in the LTE downlink channelization are used for channel estimation for the uplink shared channel signal.

68. The apparatus of claim 61, wherein the second network communication channelization is an LTE downlink channelization, and the first network communication channelization is an LTE downlink channelization or an LTE uplink channelization.

* * * * *